United States Patent

[11] 3,603,157

| [72] | Inventor | Allen D. Krugler, Jr.<br>Livonia, Mich. |
|---|---|---|
| [21] | Appl. No. | 2,602 |
| [22] | Filed | Jan. 13, 1970 |
| [45] | Patented | Sept. 7, 1971 |
| [73] | Assignee | Ford Motor Company<br>Dearborn, Mich. |

[54] INTEGRATING ACCELEROMETER
4 Claims, 1 Drawing Fig.

[52] U.S. Cl. .................................................. 73/503,
303/21 R
[51] Int. Cl. ............................................. G01p 15/08
[50] Field of Search .......................................... 73/503,
517; 303/21

[56] References Cited
UNITED STATES PATENTS
2,916,279 12/1959 Stanton ........................ 73/503 X

| 2,978,638 | 4/1961 | Wing et al. ................... | 73/503 X |
| 3,016,752 | 1/1962 | Huebschmann .............. | 73/517 |
| 3,455,148 | 7/1969 | Foster et al. ................. | 73/517 X |

*Primary Examiner*—Richard C. Queisser
*Assistant Examiner*—Herbert Goldstein
*Attorneys*—John R. Faulkner and Donald J. Harrington ABSTRACT: An electronic circuit for developing a voltage signal that is proportional in magnitude to the acceleration of a moving body including an integrator circuit having an input signal equal to the sink voltage of a field-effect transistor with an insulated gate, the gate voltage for the transistor being supplied by a variable capacitance circuit, and a mass-spring system for varying the capacitance thereby causing a gate voltage on said transistor that is related in magnitude to the inertia forces acting on the mass of the mass-spring system.

PATENTED SEP 7 1971 3,603,157
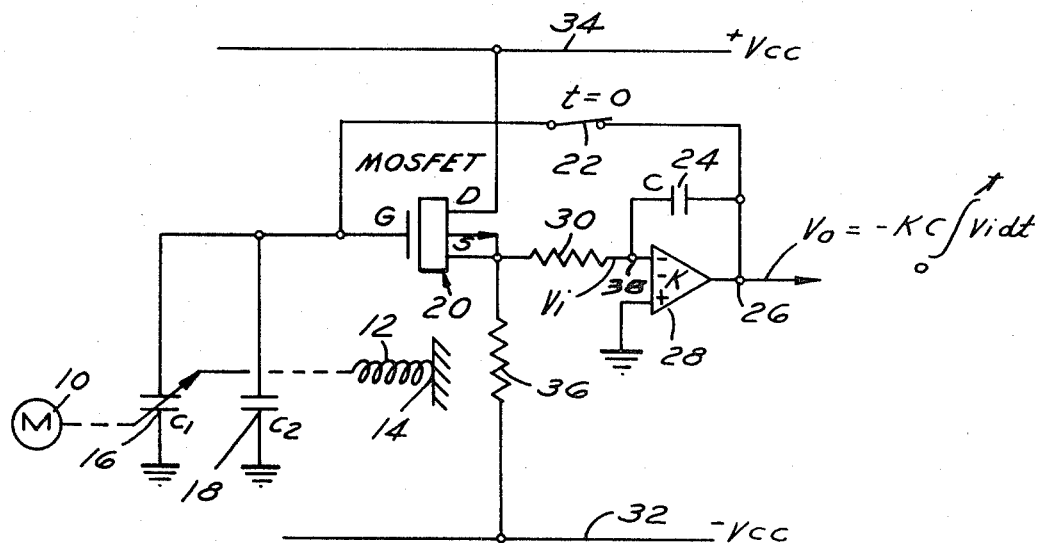
INVENTOR:
ALLEN D. KRUGLER, JR.
BY:
ATTORNEYS

INTEGRATING ACCELEROMETER

GENERAL DESCRIPTION OF THE INVENTION

The improvements of my invention are adapted to be used in an antiskid brake system for an automotive vehicle of the type disclosed in my copending application Ser. No. 1,664, filed Jan. 1, 1970, and in application of Jania and Vanderberg, Ser. No. 3,122, filed Jan. 15, 1970. Each of these applications is assigned to the assignee of my instant invention. They may be referred to for the purpose of supplementing this disclosure.

In an antiskid brake system for an automotive vehicle having fluid pressure operated vehicle wheel brakes, fluid braking pressure is supplied to the wheel brakes by the operator as he pressurizes a master brake cylinder. The control system detects incipient slipping at the wheel-road interface and responds to a predetermined wheel slippage to relieve the braking pressure until the wheel accelerates to a value which will result in the desired wheel slip. Such controls use a vehicle speed signal and a wheel speed signal. The vehicle speed signal may be obtained by integrating a deceleration signal, thus producing a resultant signal that is an indicator of vehicle speed rather than an indication of the change in vehicle speed for a given period during the braking mode. The integrating accelerometer of my invention can be used to produce the deceleration signal required by the wheel slip control system.

My invention includes a mass-spring system having a mass that is displaced in response to acceleration or deceleration of the vehicle. The displacement of the mass is opposed by a spring, and when the spring and the mass are properly calibrated, the displacement of the mass can be transposed into an adjustment of a variable capacitor in the circuit on the input side of an insulated-gate, field-effect transistor. When the transistor is disposed in a circuit with its drain side connected to a voltage source and with its source connected to a control resistor, a reference voltage is produced. This voltage may be integrated by an integrator circuit to produce an output voltage that is an indicator of the acceleration of the vehicle.

BRIEF DESCRIPTION OF THE DRAWING

The single view of the drawing shows in schematic form the electrical circuitry for my integrating accelerometer.

PARTICULAR DESCRIPTION OF THE INVENTION

In the drawing reference character 10 represents a mass which forms a part of an inertia mass-spring system. It is carried by the vehicle and is subjected to acceleration and deceleration forces as the vehicle accelerates and decelerates. Its displacement is opposed by a spring 12, which is fixed at 14 to a stationary portion of the vehicle. Storage capacitors 16 and 18 have a common side connected to the ground and another common side connected to an insulated gate for field effect transistor 20. Capacitor 16 is a variable capacitor and is connected mechanically to the mass 10. The capacitance of capacitor 16 changes as the mass 10 is displaced in one direction or the other.

The gate for transistor 20 is connected through a normally closed switch 22 to one side of integrator capacitor 24 and to the output side 26 of an integrator circuit. This circuit includes a negative high-gain amplifier 28 connected at one side to the ground and at the other side to the opposite side of the capacitor 24. That side of the capacitor is connected to the source of the transistor 20 through a control resistance 30. The source is connected also to line 32, which is of a lower potential than supply line 34. This connection is established by control resistor 36.

The gate voltage is equal to the voltage across capacitor 24. When switch 22 is closed, source current in the transistor 20 is developed, which is sufficient to create the charge on capacitor 24 which in turn determines the gate voltage. When the brakes are applied, switch 22 is opened thereby isolating the capacitor 24 from the gate. At this time the charge that existed immediately prior to the opening of switch 22 is stored in the capacitors 16 and 18.

As deceleration takes place during braking, the capacitance of capacitor 16 changes thereby influencing the gate voltage. This in turn has an influence on the source current.

Transistor 20 is a source follower transistor. The change in voltage at the source thus is related functionally to the change in capacitance of capacitor 16 which in turn is related functionally to the deceleration. The integrator circuit integrates this signal to produce a resultant signal at point 26 which is equal to the quantity $$KC \int_0^t V_i \, dt$$

This signal is an indication of the output voltage.

When switch 22 is closed, it shorts the differential amplifier 28 to the gate of the transistor 20. It then acts to null the integrator. The switch has the same effect as though it were connected to the output side of the transistor 20. When the operational amplifier is shorted by the switch, its output is zero. At the instant braking is initiated, however, the switch 22 is opened. Any change in deceleration then will be accompanied by development of a signal at point 38, which is integrated to produce a velocity output signal at point 26.

Having thus described a preferred form of my invention, what I claim and desire to secure by U.S. Letters Patent is:

1. An integrating accelerometer for developing a voltage signal proportional in magnitude to the change in the instantaneous velocity of a moving body, said accelerometer being carried by said body and including an inertia mass, a variable capacitance capacitor connected to said mass whereby displacement of said mass due to inertia forces results in a change in capacitance, a field-effect transistor having a gate connected to one side of said capacitor, an integrator amplifier circuit with its input side connected to the output side of said transistor, and a normally closed switch connecting said gate to the output side of said amplifier circuit and adapted to be opened to initiate an integration function and provide said signal thereby permitting measurement of said instantaneous velocity relative to the velocity of said body at the instant said switch is opened.

2. The combination as set forth in claim 1 wherein said transistor is an insulated-gate, field-effect transistor having a drain side connected to a voltage source and a sink connected to the input side of said amplifier circuit, said transistor having a follower characteristic whereby the input voltage to said amplifier circuit is substantially equal to the gate voltage of said transistor.

3. An integrating accelerometer for developing a voltage signal proportional in magnitude to the change in the instantaneous velocity of a moving body, said accelerometer being carried by said body and including an inertia mass, a variable capacitance capacitor connected to said mass whereby displacement of said mass due to inertia forces results in a change in capacitance, a field-effect transistor having a gate connected to one side of said capacitor, an integrator amplifier circuit with its input side connected to the output side of said transistor, a normally closed switch connecting said gate to the output side of said amplifier circuit, a spring connected to said mass and defining with said mass a mass-spring system having a displacement that is proportional to deceleration forces acting on said body, said switch being adapted to be opened as deceleration is initiated thus causing an integration function in said integrator circuit to produce a voltage signal that is an indication of the change in velocity relative to the velocity of the body at the instant said switch is opened.

4. The combination set forth in claim 3 wherein said transistor is an insulated-gate, field-effect transistor having a drain side connected to a voltage source and a sink connected to the input side of said amplifier circuit, said transistor having a follower characteristic whereby the input voltage to said amplifier circuit is substantially equal to the gate voltage of said transistor.